United States Patent
Yamamoto et al.

[11] 3,741,661
[45] June 26, 1973

[54] UNIVERSAL POLARIMETER

[75] Inventors: Tadaaki Yamamoto; Toshiyuki Kasai, both of Kawasaki-shi, Kanagawa-ken, Japan

[73] Assignee: Nippon Kogaku K.K., Tokyo, Japan

[22] Filed: Apr. 12, 1971

[21] Appl. No.: 133,046

[30] Foreign Application Priority Data
Apr. 16, 1970 Japan.............................. 45/32218

[52] U.S. Cl................. 356/117, 250/225, 350/157, 350/159
[51] Int. Cl. ............................................. G01n 21/40
[58] Field of Search.................... 356/116, 117, 118; 250/225; 350/157, 159

[56] References Cited
UNITED STATES PATENTS
2,976,764  3/1961  Hyde et al. .......................... 356/116
3,157,727  11/1964  Hardy et al. ......................... 356/117

*Primary Examiner*—Ronald L. Wibert
*Attorney*—Harry G. Shapiro

[57] ABSTRACT

A polarimeter is constructed to measure the two variables of polarization (angle of elliptical orientation and phase difference) of a polarized light beam after transmitting through a specimen oriented at an arbitrary angle. A polarizer and an analyzer are arranged on an optical axis in spaced-apart and crossed-Nicol prism relation. An optical modulator positioned intermediate the polarizer and the analyzer, has means connected thereto for the application of two separated signals to the modulator. A rotatable quarter-wave plate and a rotatable half-wave plate are cooperably related to the polarizer, analyzer and optical modulator, there being a servomotor coupled to the quarter-wave plate and another servomotor coupled to the half-wave plate. The optical modulator acts to modulate both of the two variables of polarization. One of the two signals derived from the optical modulator is applied to one servomotor to drive the quarter-wave plate, and the second signal is applied to the other servomotor to drive the half-wave plate. In the polarimeter, is incorporated into a device which can determine the direction of a major axis of polarization ellipse and the phase-difference in units of wave-length. The device is also capable to indicate the direction of the "fast" axis of a specimen affecting a polarization state of light.

7 Claims, 12 Drawing Figures

UNIVERSAL POLARIMETER

BACKGROUND OF THE INVENTION

1. Field of the Invention

The present invention relates to improvements in polarimeters capable of measuring the two variables of polarization (angle of elliptical orientation and phase difference) of a specimen oriented at an arbitrary angle. A polarimeter of this kind will hereinafter be referred to in the specification and claims as a "universal polarimeter."

2. Description of the Prior Art

The conventional universal polarimeter employs a compensator such as a Babinet-Soleil compensator which requires displacement of an element in a direction perpendicular to incident light beam for compensation of a phase difference to be measured is rotated as a body about the incident light beam so that the principal axis of compensator may be coincided with a semi axis of ellipse of incident polarized light. The mechanism of the conventional polarimeter is quite complicated and the measurement is quite time-consuming. Furthermore, it is difficult to attain an accuracy of the order of λ/1000 when the Babinet-Soleil compensator is used visually, λ being the wave-length of used light.

In the ellipsometer type of polarimeter, see for example, "Ellipsometry in the Measurement of Surfaces and Thin Films" by E. Passaglia et al (editors), Nat. Am. Standard, 1964, and H. Takasaki, Japan, Opt. Soc. Am. 51, 463, 1961, the two variables of polarization of the light transmitting through a specimen may be measured only by setting the specimen in such a manner that its principal axis be coincided with a fixed orientation. However, this type of polarimeter has a fundamental limitation; the specimen cannot be oriented at an arbitrary angle.

SUMMARY OF THE INVENTION

A universal polarimeter made in accordance with the invention comprises a polarizer and an analyzer arranged on an optical axis in spaced-apart and crossed-Nicol prism relationship. An optical modulator is positioned intermediate the polarizer and the analyzer. The modulator which serves to modulate the two variables of polarization, derives two separated signals from a suitable source, such as an oscillator. A rotatable quarter-wave plate and a rotatable half-wave plate are positioned intermediate the polarizer and the optical modulator. A servomotor is coupled to the quarter-wave plate, and another servomotor is coupled to the half-wave plate. Circuitry is provided for respectively applying the separated signals derived from the optical modulator to the servomotors to respectively drive the quarter-wave and half-wave plates. In the polarimeter, is incorporated a device which can determine the direction of a major axis of polarization ellipse and the phase-difference in units of wave-length. The device is also capable to indicate the direction of the "fast" axis of a specimen affecting a polarization state of light.

DESCRIPTION OF THE PREFERRED EMBODIMENT

Figure 1:
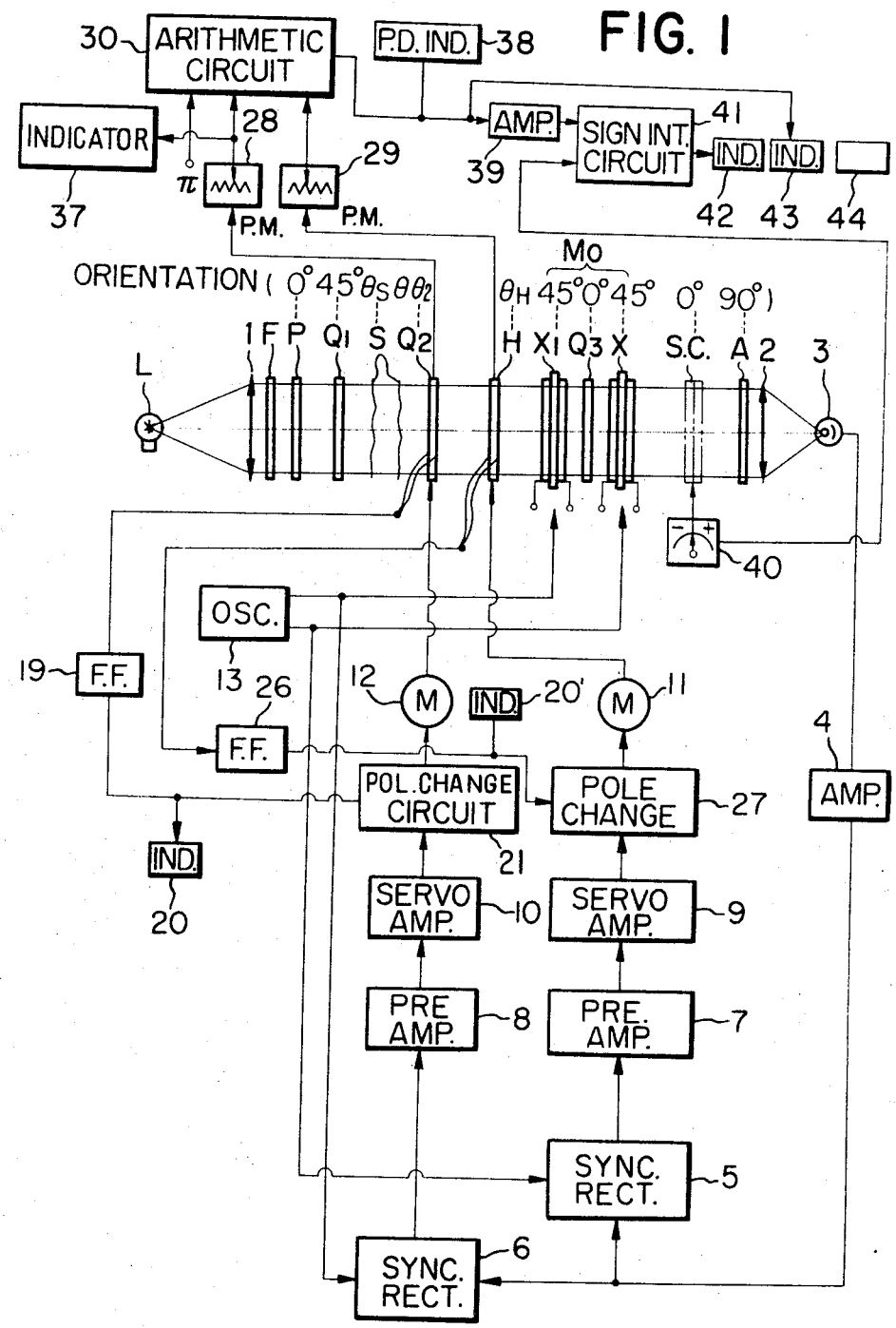
FIG. 1 is a schematic diagram of a universal polarimeter made in accordance with the invention.

As shown in FIG. 1, a light source L is related to an illuminable optical system 1, and a monochromatic interference filter F is positioned in front of the illuminable optical system. A linear polarizer P and an analyzer A are arranged on the optical axis of the polarimeter in spaced-apart and crossed-Nicol prism relationship. The analyzer A is oriented at 90° with respect to the polarizer. The linear polarizer P is oriented at a fixed azymuth which is specified as a reference. A quarter-wave plate $Q_1$ oriented at 45° is positioned in front of the linear polarizer. The specimen S to be measured for angle of its "fast" axis and phase difference is positioned next to the quarter-wave plate $Q_1$. The specimen is oriented at any arbitrary angle.

An optical modulator Mo is positioned intermediate the polarizer P and the analyzer A. Preferably, the modulator comprises a crystal element $X_1$, a quarter-wave plate $Q_3$ and a second crystal element $X_2$. The principal axis of each crystal element is oriented at 45°, and each crystal element may be made, for example, of potassium di-hydrogen phosphate (K.D.P.). The optical modulator serves to modulate both the angle of orientation and phase of the linearly polarized light indicated by P in FIG. 6b.

As also shown in FIG. 1, a quarter-wave plate $Q_2$, which is rotatable about its normal axis, is mechanically coupled to a servomotor 12. A half-wave plate H, which is rotatable about its normal axis, is mechanically coupled to another or second servomotor 11. The quarter-wave plate $Q_2$ is spaced from the half-wave plate H, and both of these plates are located intermediate the polarizer P and the optical modulator Mo.

Two separated signals are applied to the optical modulator. Preferably, the means for applying such signals comprises an oscillator 13 having one side thereof connected to the crystal $X_1$ and the other side connected to the crystal $X_2$. Thus, the oscillator applies an alternating voltage (square waveform) $E_{x1}$ to the crystal element $X_1$ and a second separate signal $E_{x2}$ to the crystal element $X_2$, which is out of phase by 90° degrees from the alternating voltage $E_{x1}$ (see FIG. 2).

Figure 2:
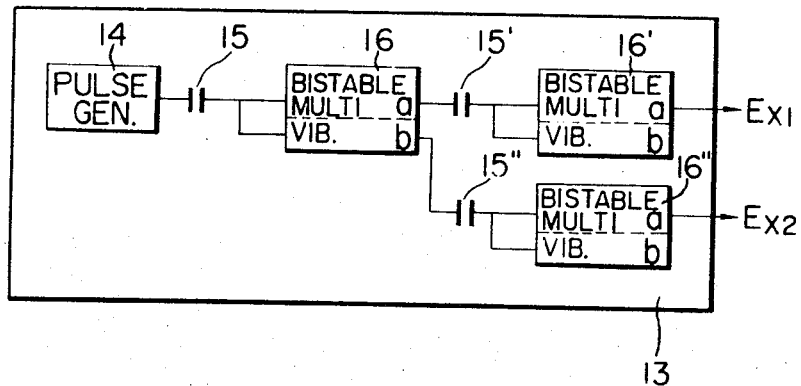
FIG. 2 is a block diagram of the means or oscillator component for applying separated signals to the optical modulator.

In greater detail, and as shown in FIG. 2, the oscillator 13 comprises a pulse generator 14, capacitors 15, 15' and 15'', and bistable multivibrators 16, 16' and 16''. The bistable multivibrator 16 which is triggered by the pulse from the pulse generator 14 through the capacitor 15 furnishes two signals out of phase by 180° from each other. When the signals so out of phase are applied through the capacitors 15' and 15" to the bistable multivibrators 16' and 16", respectively, two output signals out of phase by 90° from each other are obtained, and are impressed upon the optical modulator Mo. Such separated signals are derived from the optical modulator for respective application to the servomotors 11 and 12 to respectively drive the half-wave plate H and the quarter-wave plate $Q_2$.

Still referring to FIG. 1, S.C. designates a Savart plate which, instead of being used for the measurement of the two variables of polarization, is used to indicate both a true orientation of the specimen and a true phase-difference, as explained later. An observation optical system 2 is positioned forward of the analyzer A.

Means are provided for respectively applying the separated signals originating from the oscillator 13 and derived from the optical modulator Mo to the servomotors 11 and 12 to respectively drive the half-wave plate H and the quarter-wave plate $Q_2$. Preferably, such means comprises a photoelectric tube 3 located on the central longitudinal axis of the polarimeter and at the extremity thereof opposite to the extremity where the light source L is located. An amplifier 4 is connected to the photoelectric tube 3, and the current is rectified by synchronous rectifiers 5 and 6 to derive the signal components from the photocurrent which are in phase with the signals from the oscillator 13. The outputs of the synchronous rectifiers 5 and 6 are applied to polarity change circuits 21 and 27, respectively, through preamplifiers 7 and 8 and servo-amplifiers 9 and 10, respectively. The polarity change circuits 21 and 27 change the polarity of the DC servomotors 12 and 11 in response to the signals from flip-flops 19 and 26 which are respectively connected to the quarter-wave plate $Q_2$ and the half-wave plate H.

Figure 3:
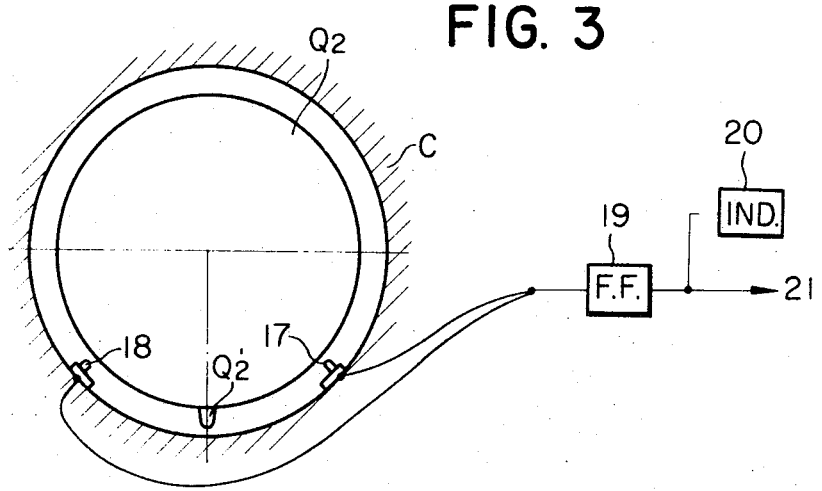
FIG. 3 is a view, on an enlarged scale, illustrating the quarter-wave plate component which is driven by one of the servomotors of the polarimeter.

The quarter-wave plate $Q_2$ and the half-wave plate H are each provided with means cooperable with angularly spaced microswitches for a purpose to be described. As shown in FIG. 3, a projection $Q_2$ extends from the quarter-wave plate $Q_2$ in the direction of the plate's principal axis to enable the actuation of the spaced micro-switches 17 and 18. The micro-switches are fixed to a casing C at angles of 45° with respect to the principal axis of the plate. The flip-flop 19 reverses the outputs from the angularly spaced microswitches 17 and 18 when they are actuated by the projection $Q'_2$ and applies the reversed outputs to the polarity change circuit 21 for the servomotor 12. An indicator 20 indicates which of the two microswitches is actuated by the projection $Q'_2$.

Figure 4:
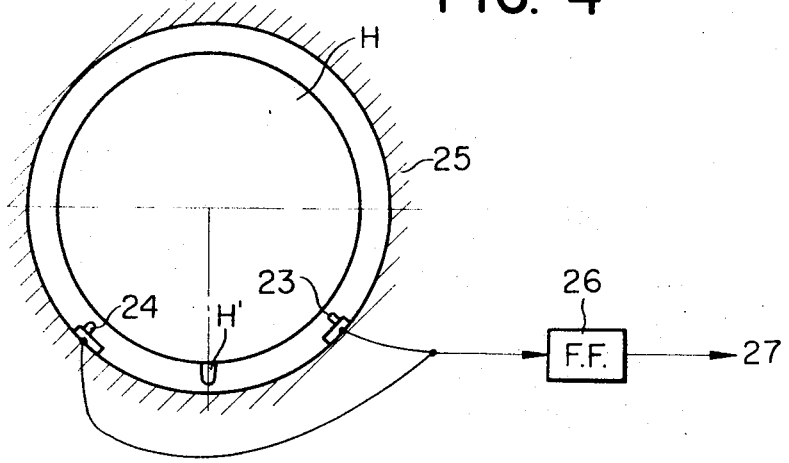
FIG. 4 is a view, on an enlarged scale, illustrating the half-wave plate component which is driven by another or second servomotor of the polarimeter.

Referring to FIG. 4, a projection H' extends from the half-wave plate H in the direction of its principal axis for the actuation of angularly spaced microswitches 23 and 24. The microswitches are fixed to a casing 25 at angles of 45° relative to the principal axis of the half-wave plate. The flip-flop 26 reverses the outputs of the microswitches, and applies the reversed outputs to the polarity change circuit 27.

Referring to FIG. 1, potentiometers 28 and 29 are provided for detecting or sensing the angles of rotation of the quarter- and half-wave plates $Q_2$ and H. The potentiometers are connected to an arithmetic circuit 30. An indicator 37 is provided to indicate the angle of orientation in response to a signal from the potentiometer 28, which senses the angle of rotation of the quarter-wave plate.

Figure 5:
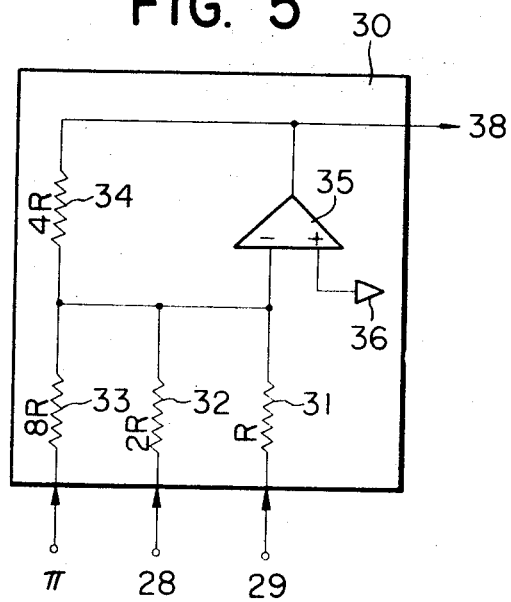
FIG. 5 is a block diagram of the arithmetic circuit component of the polarimeter.

Referring to FIG. 5, the arithmetic circuit 30 comprises resistors 31, 32, 33 and 34 whose values are R, 2R, 8R and 4R respectively, an arithmetic or operational amplifier 35 and a grounding terminal 36. The signal from the half-wave plate potentiometer 29 is applied to the resistor 31; the signal from the quarter-wave plate potentiometer 28 is applied to the resistor 32; and a constant signal represented by $\pi$ is applied to the resistor 33. The arithmetic circuit computes $$P = \pi/2 - (4H - 2Q_2)$$

where $H$ = angle of rotation of the half-wave plate $H$; and $Q_2$ = angle of rotation of the quarter-wave plate $Q_2$.

The output P is fed to a phase difference indicator 38.

Figure 6A:
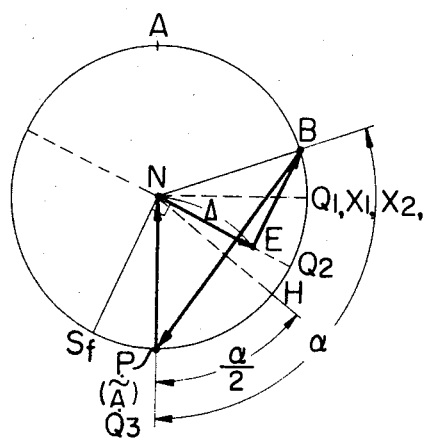
FIGS. 6a through 6e are graphs explaining the method for obtaining the two variables of polarization (angle of elliptical orientation and phase difference) of a specimen, Poincare's sphere being viewed from its N pole.

The principle and mode of operation of the polarimeter of the invention will be explained with reference to FIGS. 6a–6e. Referring to FIG. 6a, the light from the light source L is polarized into linearly-polarized light by the linear polarizer P as indicated by P, and into circularly polarized light N by the quarter-wave plate $Q_1$. The circularly polarized light enters the specimen S and becomes the elliptically polarized light E, causing a phase difference of $\Delta$.

When the quarter-wave plate $Q_2$ is rotated to an angle of 45° with respect to the "fast" axis Sf of the specimen S, the elliptically polarized light E is caused to have a phase difference of 90°, and is polarized into linearly polarized light B at an angle of orientation $\alpha$. The half-wave plate H is oriented at an angle of $\alpha/2$ so that the linearly polarized light B is caused to have its angle of orientation rotated through an angle of $\alpha$, whereby the polarized light B become the linearly polarized light indicated by $\widetilde{A}$ at an angle of orientation of zero degree with respect to the polarizer. The linearly polarized light $\widetilde{A}$ is extinguished by the analyzer A. Due to the orientations or the respective angles of rotation of the quarter-wave and half-wave plates $Q_2$ and H, both the phase difference and the angle of elliptical orientation may be derived, as will be subsequently described in detail.

The manner in which the quarter-wave plate $Q_2$ and the half-wave plate H are automatically set to the desired orientations will now be described. The linearly polarized light P is modulated in phase and angle of orientation by the optical modulator Mo. The modulated light which phases through the analyzer A is incident upon the photoelectric tube 3. Referring to FIG. 1, the tube 3 furnishes two signals or outputs which are separated and amplified by the amplifier 4, the synchronous rectifiers 5 and 6, the pre-amplifiers 7 and 8, the servo-amplifiers 9 and 10 and, the polarity change circuits 21 and 27, and applied to the servomotors 11 and 12 to rotate the quarter-wave plate $Q_2$ and the half-wave plate H. The angles of rotation of both the quarter-wave plate and the half-wave plate are limited to ± 45°. Thus, when the quarter-wave plate rotates through such arc or sector, the projection $Q'_2$ actuates either microswitch 17 or 18 so that the output may be applied to the polarity change circuit 21 through the flip-flop 19, thereby reversing the rotation of the plate.

In a similar manner the half-wave plate H is caused to reverse its rotation. The projection H' actuates either of the switches 23 or 24 at the angles of orientation of ± 45°. When the quarter-wave plate $Q_2$ and the half-wave plate H are rotated through such angles of rotation, the photocurrent output from the tube 3 becomes zero, whereby the quarter-wave plate and the half-wave plate may be held in those orientations.

Figure 6B:
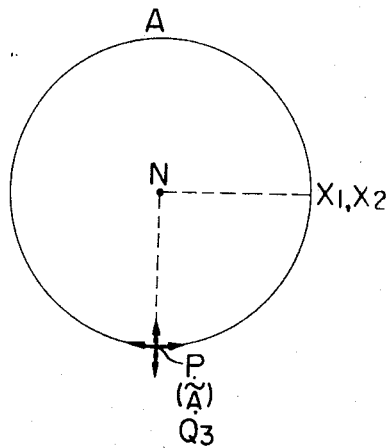
Figure 6C:
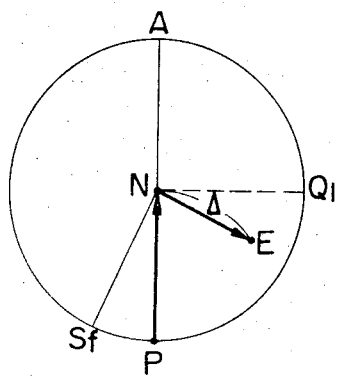

When the polarization is traced back from the analyzer A, it will be observed that the polarization by which both the phase-modulated and orientation-modulated signals become zero is the linearly polarized light $\tilde{A}$ that is oriented at an angle of 90° with respect to the analyzer A. Due to the optical modulator Mo, the linearly polarized light $\tilde{A}$ is phase-modulated and orientation modulated simultaneously and oriented at 0° (FIG. 6b). The linearly polarized light emerging from the polarizer P passes through the quarter-wave plate $Q_1$ and the specimen S so that it is polarized as shown at E in FIG. 6c. When the polarized light A which is traced back through the half-wave plate H and the quarter-wave plate $Q_2$ coincides with the polarized light E, then the polarized light E may be analyzed.

Figure 6D:
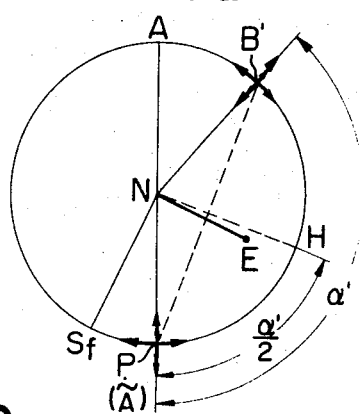
Figure 6E:
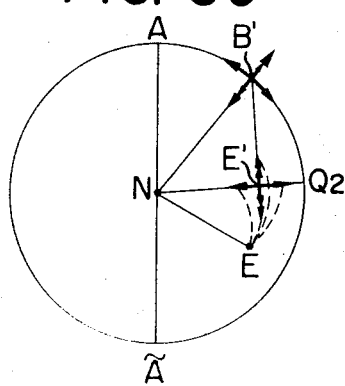

When the half-wave plate H is oriented at $\alpha'/2$ as shown in FIG. 6d, the polarized light $\tilde{A}$ is modulated into the linearly polarized light B' at an angle of orientation $\alpha'$. Due to the orientation of the quarter-wave plate $Q_2$, the light is polarized as indicated by E' in FIG. 6e. As shown, the difference in the arcs of the great circles passing through the point E and the ends of the amplitudes of the polarized light E' are detected as signals modulated in both angle of orientation and phase difference. Therefore, the quarter-wave plate $Q_2$ and the half-wave plate H may be rotated until the difference becomes zero; that is, until the light E coincides with the light E'. The rotation of the plates is automatically stopped when they coincide with each other. Referring to FIG. 1, the angle of orientation (the angle of rotation) of the quarter-wave plate $Q_2$ is detected by the potentiometer 28, and is indicated by the orientation indicator 37. The angle of orientation (the angle of rotation) of the half-wave plate H is detected by the potentiometer 29. The arithematic circuit 30 computes the output P from the signals by the potentiometers 28 and 29 and the constant signal $\pi$. The output P is amplified by an amplifier 39 and then fed to a sign integrating circuit 41. The absolute value of the output | P | is fed to an indicator 43.

Next the method of obtaining the angle of elliptical orientation and the phase difference $\Delta$ from the readings of the orientation indicator 37 and the phase difference indicator 38 will be described.

Figure 7A:
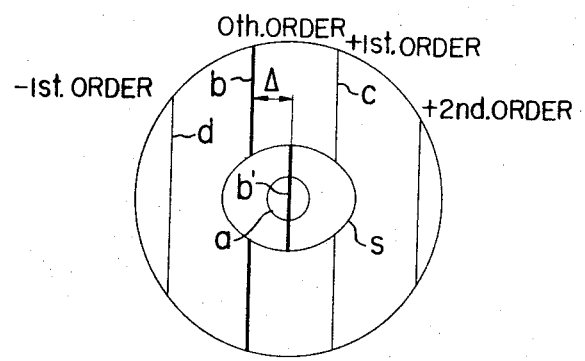
FIGS. 7a and 7b illustrate the fields of view as observed when using the Savart plate in determining the direction of phase difference of a specimen.
Figure 7B:
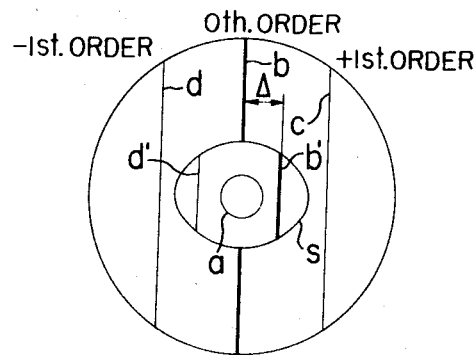

After the measurement of the two variable of polarization of a specimen (angle of elliptical orientation and phase difference) has been accomplished, the servomotors 12 and 11 for the quarter-wave plate $Q_2$ and the half-wave plate H are turned off in order to maintain the plates in their related angular positions. Next, and referring to FIG. 1, the interference filter F is removed to provide white light, and the Savart plate S.C. is positioned at an angle of 45° with respect to the analyzer A. The resultant field of view is shown in FIG. 7a. Two interference fringes displaced by the boundary of the image of the specimen S are observable. In FIGS. 7a and 7b, a denotes a detecting portion; b and b' indicate the interference fringes of the 0-th order; c designates the interference fringe of the plus (+) 1-st order; and d indicates the interference fringe of the minus (−) 1-st order.

Referring to FIG. 1, the Savart plate S.C. is inclined by a manually operable member 40 until the 0-th order interference fringe b is centered as shown in FIG. 7b. The other interference fringe b' is within the image of the specimen, but displaced from the center due to its phase-difference. The manually operable member 40 serves to apply a positive signal to a code integrating circuit 41 when the Savart plate S.C. is inclined to the right, and a negative signal is applied to such circuit when the plate S.C. is inclined to the left. The code or sign integrating circuit 41 multiplies the sign of the output P of the arithmetic circuit 30 by the sign resulting from the inclination (right or left) of the manually operable member 40. Sign indicator 42 indicates whether a positive or negative sign is applied.

The phase difference $\Delta$ of the specimen is furnished by an indicator 43. When the sign indicated by the sign indicator 42 is positive, the true phase difference is P, and $2\pi - P$ when the sign is negative, apart from a difference of an integral number times wave-length, if any, the integral number can be easily determined from the fringe displacement of the fringe b', referring to FIG. 7a or 7b.

When the projection $Q_2'$ of the quarter-wave plate $Q_2$ does not actuate either of the microswitches 17 or 18, the angle of elliptical orientation is the angle of rotation $Q_2$ (FIG. 6e) of the quarter-wave plate $Q_2$ indicated by the indicator 37. However, when the projection $Q_2'$ actuates microswitch 17 or 18 so that the indicator 20 indicates the actuation of the microswitch 17 or 18, the true angle of orientation of the specimen "fast" axis is $(90° + Q_2)$. To represent the units of phase difference $\Delta$, a unit indicator 44 is provided, as shown in FIG. 1.

In the preferred embodiment, the multiplication of the sign of the output P of the arithmetic circuit 30 by the sign representing the direction of inclination of the Savart plate S.C. is automatically carried out by the circuits 39–43. It will be understood, however, that such circuits are not required; the calculation may be carried out by the operator.

It is believed that the advantages and improved results furnished by the universal polarimeter of the invention will be apparent from the foregoing detailed description thereof. Various changes and modifications may be made without departing from the spirit and scope of the invention as sought to be defined in the following claims.

We claim:

1. A universal polarimeter comprising a polarizer and an analyzer arranged on an optical axis in spaced-apart and crossed-Nicol prism relation, an optical modulator intermediate the polarizer and the analyzer, means connected to the optical modulator for applying two separated signals thereto, a rotatable quarter-wave plate and a rotatable half-wave plate intermediate the polarizer and the optical modulator, a first servomotor coupled to the quarter-wave plate, a second servomotor coupled to the half-wave plate, and means for respectively applying the separated signals derived from the optical modulator to the first and second servomotors to drive the quarter-wave and half-wave plates.

2. A universal polarimeter according to claim 1, wherein a second quarter-wave plate is positioned between the polarizer and said rotatable quarter-wave plate; and a Savart plate is positioned intermediate the optical modulator and the analyzer, the Savart plate being displaceable in opposite directions to define positive and negative signs.

3. A universal polarimeter according to claim 1, wherein the means connected to the optical modulator for applying two separated signals thereto comprises an oscillator; and wherein the means for respectively applying the separated signals derived from the optical modulator to the first and second servomotors to drive the quarter-wave and half-wave plates comprises a photoelectric tube having an amplifier connected thereto, a pair of synchronous rectifiers connected to the amplifier and to the opposite sides of the oscillator, the first servomotor being connected to one rectifier, the second servomotor being connected to the other rectifier, and a polarity change circuit, a servo-amplifier and a pre-amplifier being respectively connected to each servomotor and its respective rectifier.

4. A universal polarimeter according to claim 1, wherein said rotatable quarter-wave plate is provided with a projection extending from its principal axis; wherein said half-wave plate is provided with a projection extending from its principal axis, a pair of angularly spaced microswitches respectively related with said rotatable quarter-wave and half-wave plates for engagement by the respective projections of the said quarter-wave and said half-wave plates, and flip-flops connected to the pairs of microswitches, the flip-flops being respectively connected to the quarter-wave and half-wave plates.

5. A universal polarimeter according to claim 1, wherein potentiometers are respectively connected to said quarter-wave and half-wave plates to detect the angles of rotation thereof, and an arithmetic circuit is connected to the potentiometers, the arithmetic circuit providing the calculation $$P = \pi/2 - (4H - 2Q_2),$$

where $H$ is an angle of rotation of the half-wave plate, and $Q_2$ is an angle of rotation of the quarter-wave plate.

6. A universal polarimeter according to claim 3, wherein said rotatable quarter-wave plate is provided with a projection extending from its principal axis; wherein said half-wave plate is provided with a projection extending from its principal axis, a pair of angularly spaced microswitches respectively related with said rotatable quarter-wave and half-wave plates for engagement by the respective projections of the said quarter-wave and said half-wave plates, and flip-flops connected to the pairs of microswitches, the flip-flops being respectively connected to the quarter-wave and half-wave plates; wherein potentiometers are respectively connected to said quarter-wave and half-wave plates to detect the angles of rotation thereof, and an arithmetic circuit is connected to the potentiometers, the arithmetic circuit providing the calculation $$P = \pi/2 - (4H - 2Q_2),$$

where $H$ is an angle of rotation of the half-wave plate, and $Q_2$ is an angle of rotation of the quarter-wave plate.

7. A universal polarimeter according to claim 6, wherein a second quarter-wave plate is positioned between the polarizer and said rotatable quarter-wave plate; and a Savart plate is positioned intermediate the optical modulator and the analyzer, the Savart plate being displaceable in opposite directions to define positive and negative signs.

* * * * *